(12) United States Patent
Heinle

(10) Patent No.: US 9,661,640 B2
(45) Date of Patent: May 23, 2017

(54) TECHNIQUE FOR PROCESSING SPECTRAL EMISSION INFORMATION IN A COMMUNICATION DEVICE WITH MULTIPLE RADIO INTERFACES

(75) Inventor: Frank Heinle, Nuremberg (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/406,992

(22) PCT Filed: Jun. 13, 2012

(86) PCT No.: PCT/EP2012/002489
§ 371 (c)(1),
(2), (4) Date: Dec. 10, 2014

(87) PCT Pub. No.: WO2013/185785
PCT Pub. Date: Dec. 19, 2013

(65) Prior Publication Data
US 2015/0163816 A1    Jun. 11, 2015

(51) Int. Cl.
*H04L 1/00* (2006.01)
*H04L 12/26* (2006.01)
*H04W 72/08* (2009.01)
*H04W 24/10* (2009.01)
*H04W 28/18* (2009.01)
*H04B 17/24* (2015.01)
(Continued)

(52) U.S. Cl.
CPC .......... *H04W 72/082* (2013.01); *H04B 17/24* (2015.01); *H04L 1/0016* (2013.01); *H04L 5/1461* (2013.01); *H04W 24/08* (2013.01); *H04W 24/10* (2013.01); *H04W 28/18* (2013.01); *H04W 72/048* (2013.01); *H04L 1/20* (2013.01); *H04W 88/06* (2013.01); *H04W 88/10* (2013.01)

(58) Field of Classification Search
CPC ... H04W 72/082; H04W 24/08; H04W 24/10; H04W 28/18; H04W 72/048; H04W 88/06; H04W 88/10; H04L 1/0016; H04L 5/1461; H04L 1/20; H04B 17/24
See application file for complete search history.

(56) References Cited

U.S. PATENT DOCUMENTS

2007/0147226 A1* 6/2007 Khandekar ........... H04L 5/0044
370/208
2009/0201862 A1* 8/2009 Okker ............... H04W 72/1242
370/329

(Continued)

FOREIGN PATENT DOCUMENTS

EP            2244509 A2      10/2010

*Primary Examiner* — Abdelnabi O Musa
(74) *Attorney, Agent, or Firm* — Rothwell, Figg, Ernst & Manbeck, P.C.

(57) ABSTRACT

A technique of processing spectral emission information in a communication device (10) having a first radio interface (12) and a second radio interface (14) is presented. The spectral emission information is indicative of an emission level associated with the first radio interface (12). A method implementation of the technique comprises the following steps performed for the first radio interface (12). First, a transmission via the first radio interface (12) is performed. From the second radio interface (14) a measurement report for the transmission is received in a next step. The spectral emission information is adapted based on the measurement report.

22 Claims, 5 Drawing Sheets

(51) Int. Cl.
*H04L 5/14* (2006.01)
*H04W 24/08* (2009.01)
*H04W 72/04* (2009.01)
*H04W 88/06* (2009.01)
*H04L 1/20* (2006.01)
*H04W 88/10* (2009.01)

(56) References Cited

U.S. PATENT DOCUMENTS

| | | | |
|---|---|---|---|
| 2010/0137025 A1* | 6/2010 | Tal | H04B 15/02 455/553.1 |
| 2010/0197235 A1* | 8/2010 | Wilhelmsson | H04W 72/02 455/63.3 |
| 2010/0304685 A1 | 12/2010 | Wietfeldt et al. | |
| 2012/0040620 A1* | 2/2012 | Fu | H04B 1/1027 455/63.1 |
| 2012/0046000 A1* | 2/2012 | Gao | H04W 72/02 455/73 |
| 2012/0219088 A1* | 8/2012 | Friedrich | H04B 1/0475 375/296 |
| 2013/0095806 A1* | 4/2013 | Salkintzis | H04L 65/601 455/414.3 |

* cited by examiner

TECHNIQUE FOR PROCESSING SPECTRAL EMISSION INFORMATION IN A COMMUNICATION DEVICE WITH MULTIPLE RADIO INTERFACES

CROSS REFERENCE TO RELATED APPLICATION(S)

This application is a 35 U.S.C. §371 National Phase Entry Application from PCT/EP2012/002489, filed Jun. 13, 2012, designating the United States, the disclosure of which is incorporated by reference herein in its entirety.

TECHNICAL FIELD

The present disclosure generally relates to a communication device with two or more radio interfaces. Specifically, a technique for processing spectral emission information for at least one of the radio interfaces is described.

BACKGROUND

In modern communication devices such as smartphones and tablet computers an increasing number of radio interfaces operate in parallel. Some radio interfaces like those defined by the family of 3rd Generation Partnership Project (3GPP) specifications are enabled to co-operate in such a way that there is no need for a transmission on one radio interface while another radio interface is receiving. In this way, in-device co-existence issues of the radio interfaces (e.g., in terms of mutual interference) can be avoided.

On the other hand there also exist radio interfaces which per se are not co-operative. For example, Bluetooth, Wideband Local Area Network (WLAN) and Global Navigation Satellite System (GNSS) radio interfaces will on a physical layer level typically not co-operate in any way with the radio interfaces defined in the 3GPP specifications.

Many use cases such as WLAN tethering or a Voice over Internet Protocol (VoIP) call with a Bluetooth headset may require a simultaneous operation of the WLAN or Bluetooth radio interface and of a cellular radio interface. Both WLAN and Bluetooth presently operate in the so-called ISM band (2400 MHz-2483 MHz), and beyond. The Frequency Division Duplex (FDD) mode of the 3GPP Long Term Evolution (LTE) radio interface may be operated in band 7 (2500 MHz-2570 MHz). The Time Division Duplex (TDD) mode of the LTE radio interface may be operated in band 40 (2300 MHz-2400 MHz) or band 41 (2496 MHz-2690 MHz). Due to the close proximity of LTE bands 7, 40 and 41 on the one hand and the ISM band on the other hand, measures have to be taken to limit the interference between the radio interfaces.

Similar interference problems occur between GNSS bands L1 and E1 (1575.42 MHz) and second order harmonics of an LTE FDD uplink signal in band 13 (777 MHz-787 MHz) or band 14 (788 MHz-798 MHz). GNSS applications typically operate at an extremely low signalling level that requires long correlation and averaging times to capture the satellite signals. As will be appreciated, an intermittent LTE transmission may even further extend the GNSS correlation and averaging times.

To combat such interference problems, filtering has been suggested for radio link protection in communication devices that integrate multiple radio interfaces. It has, however, been found that pure filtering is inadequate in case of only narrow gaps between the involved bands and because of the entailed extreme filter requirements. Another solution would be frequency evasion for certain use cases such as an LTE voice call with a Bluetooth headset. In such a situation, however, a significant portion of a network operator's frequency band would not be available for many use cases. Furthermore, additional signalling with the network side would be required. A still further approach for radio link protection could be a non-overlapping scheduling of the transmission and reception activities of different radio interfaces. Such a solution would on the other hand significantly restrict the scheduling possibilities and would hardly be appropriate for FDD solutions that do not have a natural uplink/downlink separation in the time domain.

SUMMARY

To enable a satisfactory co-existence of multiple radio interfaces in a single communication device, co-existence signalling between the radio interfaces and a suppression of transmission activities on one radio interface in case of signalled reception activities on the other radio interface may be considered. A frequent suppression of transmission activities may, however, severely affect the link quality for the affected radio interface.

Accordingly, there is a need for a technique of coordinating transmission and reception activities of two or more radio interfaces integrated in a communication device, wherein the coordination is performed in such a manner that a satisfactory behaviour of the communication device from the perspective of at least one of a network operator and a user of the device is obtained.

According to a first aspect, a method of processing spectral emission information in a communication device having a first radio interface and a second radio interface is provided, wherein the spectral emission information is indicative of an emission level associated with the first radio interface. The method comprises the following steps performed for the first radio interface: performing a transmission via the first radio interface, receiving, from the second radio interface, a measurement report for the transmission, and adapting the spectral emission based on the measurement report.

The spectral emission information may be utilized in connection with coordinating transmission and reception activities of one or both of the first radio interface and the second radio interface. In general, the spectral emission information may be provided in various forms, for example in the form of a spectral table or a spectral function. The spectral emission information may also be referred to as a spectral emission mask. The adaption of the spectral emission information may be based on predefined (e.g., worst case) spectral emission information or on previously measured spectral emission information. The spectral emission information may be predefined (e.g., in terms of emission limits) in a communication standard.

The method may further comprise determining at least one transmission parameter (e.g., a transmission parameter set) for the transmission via the first radio interface. The transmission via the first radio interface may then be performed in accordance with the one or more transmission parameters. Additionally, an indication to perform a measurement based on the at least one transmission parameter may be sent towards the second radio interface. Such an indication may be sent prior to actually performing the transmission via the first radio interface. The indication may be accompanied by the at least one transmission parameter. Alternatively, the second radio interface may have a priori knowledge regarding the transmission parameter. For measurement purposes, the second radio interface may also have a priori knowledge of at least one of a measurement start time and a measurement period.

The one or more transmission parameters may be selected from the set of transmission parameters comprising a power amplifier back-off, a carrier frequency or carrier frequency band, a system bandwidth and an actually used transmission bandwidth. The power amplifier back-off may be a difference between an actual transmit power used for the transmission and a maximum transmit power. The maximum transmit power may be defined in an applicable communication standard.

One or more of the steps described above may be repeated one or several times. The repetition may be based on different transmission parameters (e.g., to make sure that the spectral emission information can be adapted over a range of transmission parameters).

In one implementation the measurement report is received in connection with an indication of at least one of the at least one transmission parameter and a reference identifier associated with the at least one transmission parameter. As such, the at least one transmission parameter may be sent towards the second radio interface in connection with such a reference identifier associated with the transmission or the at least one transmission parameter. Based on the reference identifier, the one or more transmission parameters based on which the received measurement report has been drawn up can be identified and taken into account upon adapting the spectral emission information.

An indication of a (e.g., current or upcoming) transmission activity status of the first radio interface may be sent to the second radio interface. The indication may, for example, take the form of a simple activity flag or a more detailed information message. Moreover, the indication may be accompanied by the reference identifier associated with the transmission or the at least one transmission parameter underlying the transmission activity status. In one implementation, the indication of the transmission activity status may constitute, accompany or reference the indication to perform a measurement sent towards the second radio interface.

The method may further comprise receiving a signal indicative of an upcoming or on-going reception via the second radio interface and analysing an on-going or scheduled transmission via the first radio interface with respect to the spectral emission information. The analysis may be made responsive to receipt of that signal. Depending on a result of the analysis, the transmission may be interrupted or delayed.

As an example, the transmission may be interrupted or delayed in case spectral properties of the transmission (as defined by the spectral emission information) will violate (e.g., exceed) a tolerance limit associated with the second radio interface. This tolerance limit may be known a priori to the first radio interface. Alternatively, information regarding the tolerance limit associated with the second radio interface may be received by the first radio interface from the second radio interface. Spectral emission information may be provided and/or adapted on the basis of least one of multiple frequency bands and multiple system bandwidths. As an example, a dedicated spectral emission mask (e.g., a dedicated emission table or a dedicated emission function) may be provided for a dedicated frequency band or a dedicated system bandwidth.

According to a further aspect a method of providing a measurement report for processing spectral emission information in a communication device having a first radio interface and a second radio interface is provided, wherein the spectral emission information is indicative of an emission level associated with the first radio interface. The method comprises the following steps performed for the second radio interface: receiving an indication to perform a measurement based on at least one transmission parameter for a transmission via the first radio interface, performing a measurement of the transmission via the first radio interface, wherein the measurement is performed in accordance with the at least one transmission parameter, generating a measurement report for the measurement, and sending the measurement report towards the first radio interface.

A signal indicative of an upcoming or on-going reception via the second radio interface may be sent towards the first radio interface. Alternatively, or additionally, information regarding the spectral emission tolerance limit associated with the second radio interface may be sent towards the first radio interface.

In one implementation, no measurement action is taken in case the second radio interface in a sleep mode. In such a case, the indication to perform a measurement may be discarded or ignored.

For the second radio interface, an indication of a transmission activity status of the first radio interface may be received. In response to such an indication, the measurement may be at least one of started, resumed and stopped based on the transmission activities status of the first radio interface.

The measurement report may in general comprise one or more of a measured noise level, an indication of a spectral range or frequency that has been measured and a reference identifier associated with the transmission or the at least one transmission parameter. For an individual transmission multiple measurement reports may be generated and sent towards the first radio interface.

The method may be performed in the field during regular operation of the communication device. Alternatively, or in addition, the method may be performed in a factory in connection with device manufacturing.

The first radio interface and the second radio interface may be configured to utilize closely spaced carrier frequencies (including the consideration of second or higher order harmonics). The first radio interface may be a cellular radio interface. As an example, the first radio interface may conform to one of the Long Term Evolution (LTE), Wideband Code Division Multiple Access (W-CDMA), Global System for Mobile Communication (GSM), Time Division Synchronous CDMA (TD-SCDMA) and CDMA 2000 specifications. The second radio interface may conform to one of the WLAN, Bluetooth and GNSS specifications. Of course, the communication device may also comprise three or more radio interfaces that may be coupled with each other for the purpose of signalling (e.g., in real-time) measurements and, optionally, reception activities.

Also provided is a computer program product comprising program code portions for performing the steps of any of the methods and method aspects presented herein when the computer program product is executed on one or more computing devices. The computer program product may be stored on a computer readable recording medium such as a semiconductor memory, CD-ROM, DVD, hard disk or any other storage medium. The computer program product may also be provided for download via a network connection.

Further provided is an apparatus for processing spectral emission information in a communication device having a first radio interface and a second radio interface, wherein the spectral emission information is indicative of an emission level associated with the first radio interface. The apparatus comprises a transmitter configured to perform a transmission via the first radio interface, an input interface configured to receive, from the second radio interface, a measurement report for the transmission, and an adaptor configured to adapt the spectral emission information based on the measurement report.

The apparatus may further comprise a unit configured to determine at least one transmission parameter for the transmission via the first radio interface, wherein the transmission is performed in accordance with the at least one transmission parameter, and an output interface configured to send an indication to perform a measurement based on the at least one transmission parameter towards the second radio interface.

Still further an apparatus for providing a measurement report for processing spectral emission information in a communication device having a first radio interface and a second radio interface is provided, wherein the spectral emission information is indicative of an emission level associated with the first radio interface. The apparatus comprises an input interface configured to receive an indication to perform a measurement based on at least one transmission parameter for a transmission via the first radio interface, a measurement unit configured to perform a measurement of the transmission via the first radio interface, wherein the measurement is performed in accordance with the at least one transmission parameter, a generator configured to generate a measurement report for the measurement, and an output interface configured to send the measurement report towards the first radio interface.

Also provided is a communication device comprising the apparatus for processing spectral emission information and the apparatus for providing a measurement report. The communication device may take the form of a mobile telephone, smartphone, tablet computer, base station (or any other stationary device), and so on.

BRIEF DESCRIPTION OF THE DRAWINGS

Further details, aspects and advantages of the present disclosure will become apparent from the following description of exemplary embodiments in conjunction with the drawings, wherein.

DETAILED DESCRIPTION

In the following description, for purposes of explanation and not limitation, specific details are set forth, such as specific device configurations and specific signalling scenarios, in order to provide a thorough understanding of the present disclosure. It will be apparent to one skilled in the art that the technique presented herein may be practised in other embodiment that depart from these specific details. The skilled artisan will appreciate, for example, that the technique discussed herein may be practised in combination with other device configurations and different signalling steps. While the following embodiments will partially be described in connection with a radio interface conforming to the 3GPP LTE specifications, it will be appreciated that the present disclosure can be implemented in connection with any 3GPP or non-3GPP communication standard.

Those skilled in the art will further appreciate that the methods, steps and functions explained herein may be implemented using individual hardware circuitry, using software functioning in conjunction with a programmed microprocessor or general purpose computer, using one or more Application Specific Integrated Circuits (ASICs), one or more Digital Signal Processors (DSPs) and/or one or more Field Programmable Gate Arrays (FPGAs). It will also be appreciated that the methods, steps and functions disclosed herein may be embodied in a processor and a memory coupled to the processor, wherein the memory stores program code that results in an execution of the steps discussed herein when executed by the processor.

Figure 1:
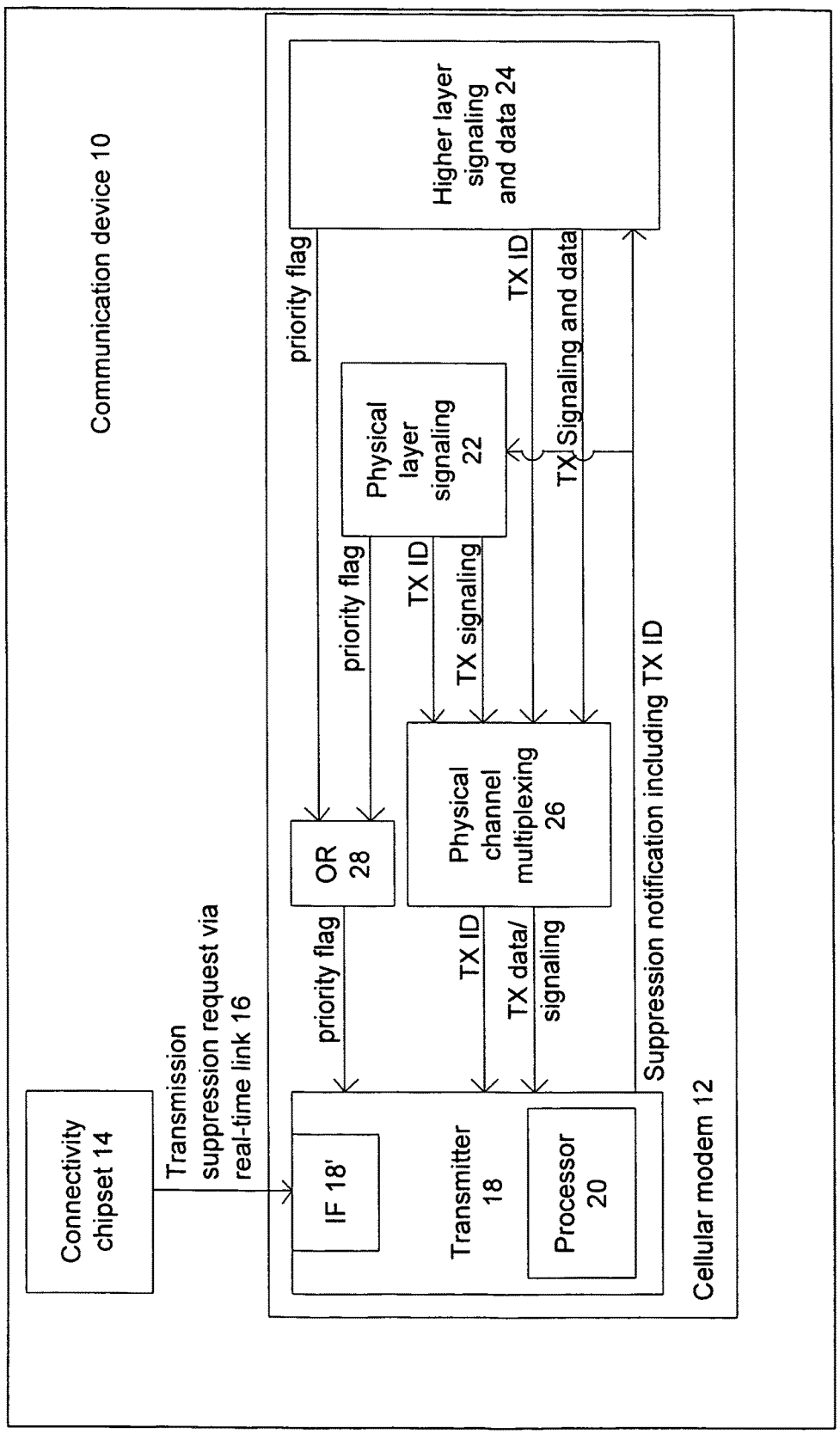
FIG. 1 schematically illustrates an embodiment of a communication device with two radio interfaces that support transmission suppression request signalling.

FIG. 1 illustrates an embodiment of a communication device 10 with multiple radio interfaces 12, 14. Specifically, as shown in FIG. 1, the communication device 10 comprises a first radio interface 12 and a second radio interface 14. The first radio interface 12 may conform to any cellular (e.g., 3GPP or non-3GPP) or non-cellular communication standard. In the following it will be assumed that the first radio interface 12 is a cellular modem that in the present embodiment conforms to at least the LTE specifications. The second radio interface 14 may likewise conform to any cellular or non-cellular communication standard. In the present embodiment it will be assumed that the second radio interface 14 is a connectivity chip set such as a WLAN radio interface or a Bluetooth radio interface. In other embodiments, the second radio interface 14 may be a GNSS radio interface, for example according to the Global Positioning System (GPS) or Galileo specifications.

As will be appreciated, the first radio interface 12 (LTE) and the second radio interface 14 (WLAN/Bluetooth) are configured to utilize closely spaced carrier frequencies (including the consideration of second and higher order harmonics). For this reason real-time signalling between the radio interfaces 12, 14 via a signalling link 16 is enabled. The transmission of signals (in the form of transmission suppression requests) from the second radio interface 14 indicates to the first radio interface 12 an upcoming reception via the second radio interface 14 and requests a temporary shutdown of the first radio interface 12 in the transmitter/uplink path. In response to such a request the first radio interface 12 may selectively interrupt or delay its transmission activities.

While the signalling across the signalling link 16 is illustrated in the exemplary embodiment of FIG. 1 to be a mono-directional signalling from the second radio interface 14 to the first radio interface 12, it will be appreciated that in other embodiments a bi-directional signalling may occur. Moreover, it will also be appreciated that in other embodiments additional radio interfaces with additional signalling links may be present.

It has been found that blindly controlling transmission activities of the first radio interface 12 based on transmission suppression requests from the second radio interface 14 may have detrimental effects on the link quality for the first radio interface 12 (or even cause a link failure and/or dropped calls for the first radio interface 12). Therefore, the first radio interface 12 illustrated in FIG. 1 is configured to prioritize one or more uplink traffic classes and to ignore, or discard, incoming transmission suppression requests from the second radio interface 14 if the suppression of transmission activities would be detrimental to the radio link quality from the perspective of the first radio interface 12. Additionally, the first radio interface 12 is configured to ignore, or discard, incoming transmission suppression requests from the second radio interface 14 if it is determined based on spectral emission information that its transmission activities would not be detrimental to the radio link quality from the perspective of the second radio interface. It should be noted that in the scope of present embodiment the prioritization procedure is an optional procedure. In other words, the spectral emission-based teachings could also be implemented alone to determine whether or not to follow a transmission suppression request signalled by the second radio interface 14.

As illustrated in FIG. 1, the first radio interface 12 comprises a transmitter 18 with an associated input interface 18' towards the second radio interface 14 for receiving transmission suppression request signalling. The transmitter 18 further comprises a processor 20 for performing one or more of the processing steps described herein. It should be noted that in other embodiments the processor 20 may be external to the transmitter 18 or even external to the first radio interface 12.

The first radio interface 12 further comprises a component 22 for prioritizing and, optionally, forwarding or generating physical layer signalling as well as a component 24 for prioritizing and, optionally, forwarding or generating higher layer signalling and data. As understood herein, signalling may comprise control information and data may comprise user or application information. The higher layer signalling includes, for example, Radio Resource Control (RRC) and Medium Access Control (MAC) signalling.

With further reference to FIG. 1, the component 22 for generating physical layer signalling as well as the component 24 for higher layer signalling and data are coupled to a physical channel multiplexing unit 26. The multiplexing unit 26 is configured to multiplex the information received from the components 22, 24 to generate multiplexed information intended for transmission via the transmitter 18. To this end, the multiplexing unit 26 is coupled to the transmitter 18.

The first radio interface 12 also comprises a signal combiner 28 coupled on its input side to both the component 22 for physical layer signalling and the component 24 for higher layer signalling and data. On its output side, the signal combiner 28 is coupled to the transmitter 18.

In the following, the operation of the communication device 10 in connection with coordinating transmission and reception activities of the two radio interfaces 12, 14 will be described in more detail. The focus of that description will be on the operation of the first radio interface 12.

For the first radio interface 12, higher layers do an internal prioritization of upcoming transmissions based on the content of the information to be transmitted and, optionally, on feedback from the transmitter 18 regarding any preceding suppressions (i.e., regarding interrupted or delayed transmissions). The information to be transmitted ("DC signalling and data" in FIG. 1) together with an associated unique identifier (TX ID) are forwarded by the component 24 to the multiplexing unit 26. Furthermore, a priority setting in the form of a binary priority flag indicating the priority of the information to be transmitted is forwarded to the signal combiner 28. In the present embodiment a logic "1" indicates priority of the information to be transmitted (i.e., that an interruption or delay of the transmission should be prevented or at least impeded). Information may, for example, be prioritized in case it relates to a retransmission or to (shared or dedicated) control channel information or in case of a presently high error rate (e.g., in terms of a Block Error Rate, BLER).

In parallel, the physical layer performs an internal prioritization of upcoming transmissions based on the content of the information to be transmitted and, optionally, on feedback from the transmitter 18 regarding any preceding suppressions (i.e., regarding an interruption or delay of previous transmissions). The information to be transmitted (TX signalling) together with an associated unique transmission identifier (TX ID) are forwarded to the multiplexing unit 26. Also, a priority setting in the form of a binary priority flag that will be set to indicate priority of the information to be transmitted is forwarded to the signal combiner 28. Physical layer information may, for example, be prioritized in case of one or more of reference signals, ACK/NACK signals, link adaptation feedback (e.g., channel quality feedback), a scheduling request, and a random access request.

The multiplexing unit 26 multiplexes the physical and higher layer information and forwards the multiplexed information (TX data/signalling) to the transmitter 18. The information to be transmitted is forwarded by the multiplexing unit 26 together with a unique transmission identifier (TX ID) calculated by the multiplexing unit 26 on the basis of the transmission identifiers received with the physical and higher layer information.

In one implementation, the sub-frame number of a frame to be transmitted could be used as the unique identifier for both the physical layer information and the higher layer information. In such an implementation, the content of the corresponding sub-frame may constitute the information to be transmitted.

The signal combiner 28 logically combines the physical and higher layer priority flags using a logical OR operation. Accordingly, if there is either physical layer information or higher layer information to be transmitted, or both simultaneously, and if at least one of them is prioritized (i.e., if the priority flag of at least one of them is set to "1"), a priority flag setting preventing or at least impeding an interruption or delay of the transmission of the corresponding information in the presence of a transmission suppression request from the second radio interface 14 is signalled to the transmitter 18.

The transmitter 18 (or a controller thereof that may be implemented by the processor 20) then decides in real-time based on the optional priority flag associated with the information intended for transmission as received from the multiplexing unit 26 and the spectral emission of the intended transmission, whether or not a currently on-going transmission is interrupted or whether a scheduled transmission will be delayed responsive to a transmission suppression request. In case a transmission is interrupted or delayed, the transmitter 18 returns a suppression notification signal back to the physical layer (component 22) and the higher layer (component 24). This suppression notification signal includes the transmission identifier (TX ID) of the sub-frame associated with the information transmission of which has been interrupted or delayed.

As stated above, spectral emission information, also referred to as Spectral Emission Mask (SEM) hereinafter, will be taken into account upon deciding whether or not to suppress an on-going or scheduled transmission in the presence of a transmission suppression request signalled by the second radio interface 14 via the real-time link 16. If it is found that the spectral shape of the transmission of the first radio interface 12 will not violate an associated tolerance limit associated with the second radio interface 14, the transmission suppression request is discarded, or ignored. In the case of a violation, in a separate analysis step the optional priority setting associated with the transmission can be analysed as discussed above. The transmission via the first radio interface 12 will then take place even in the presence of a transmission suppression request from the second radio interface 14 in case the transmission will not violate a spectral emission tolerance limit associated with the second radio interface 14 or if the optional priority flag for the information intended for transmission has been set to "1".

Since a blind implementation of the transmission suppression request from the second radio interface 14 would be quite intrusive from the perspective of the first radio interface 12, the additional analysis of spectral emission information for the first radio interface 12 helps to limit the number of interrupted or delayed transmissions of the first radio interface 12. In this connection it is suggested that the second radio interface 14 informs the first radio interface 12 of a tolerance limit regarding tolerable spectral emissions from the first radio interface 12. Based on such a tolerance limit, spectral emission information (SEM) and the current transmit power settings of the first radio interface 12, a decision can then be made whether the second radio interface 14 would be disturbed by a transmission of the first radio interface 12. In the presence of a transmission suppression request from the second radio interface 14, a transmission by the first radio interface 12 will only be suppressed in case of a disturbance.

For the present exemplary LTE implementation an SEM is predefined in table form in Chapter 6.6.2.1 of 3GPP Technical Specification (TS) 36.101, V9.11.0. It has been found that the use of a predefined SEM is not always sufficient, for example because the actual spectral emissions of the first radio interface 12 often depend on the frequency band and both the system bandwidth and the effectively used bandwidth for the transmission. For this reason any default SEM would often not take into account additional margins and might therefore deliver too pessimistic results (which would in turn cause unnecessary suppressions of transmissions from the first radio interface 12). Also additional gains like antenna isolation and front end filter selectivity of the second radio interface 14 could not be taken into account, which would again deliver too pessimistic results. It is thus suggested in one embodiment to start with an initial SEM, for example as defined in 3GPP TS 36.101, and to adapt, or calibrate, such an initial SEM during device production in the factory or in the field during regular operation of the communication device 10.

In the following, operation of the communication device 10 in connection with processing spectral emission information will be described in more detail with reference to the schematic diagram of FIG. 2. FIG. 2 again shows the communication device 10 of FIG. 1, but highlights different components of that communication device 10 in connection with adapting, or calibrating, spectral emission information.

Figure 2:
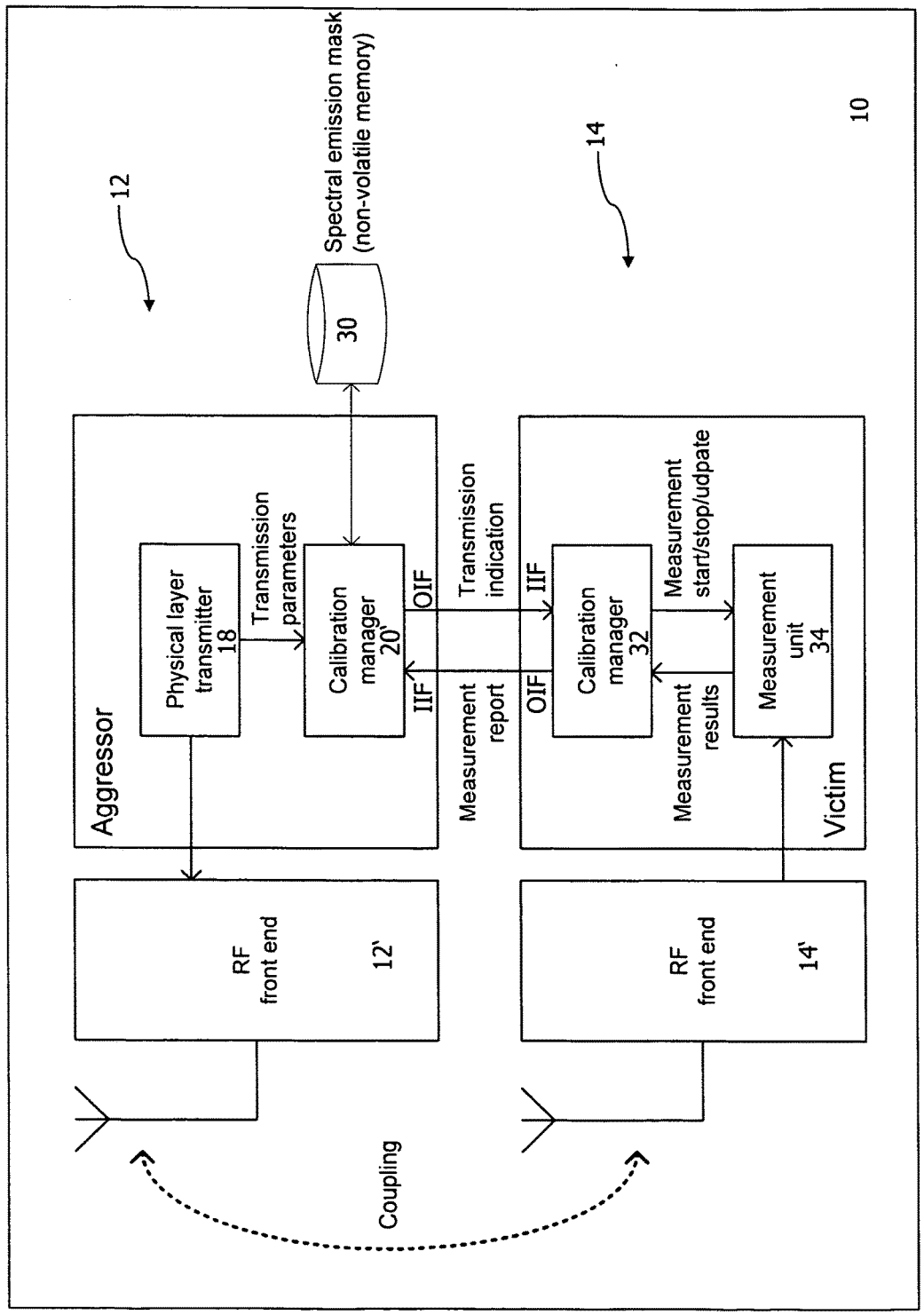
FIG. 2 schematically illustrates an embodiment of measurement and adaptation components integrated into the communication device of FIG. 2.

FIG. 2 illustrates the components of the first radio interface 12 and the second radio interface 14 involved in processing spectral emission information stored in a non-volatile memory 30 of the communication device 10. In the following the disturbing first radio interface 12 will also be called "aggressor", while the disturbed second radio interface 14 suffering from the resulting coupling will also be called "victim". It should be noted that in other embodiments the roles may change depending on the involved communication standards. As an example, LTE band 14 will interfere with the WLAN ISM band and vice versa. For this reason, the aggressor radio interface 12 and the victim radio interface 14 may have a symmetric configuration (not illustrated in FIG. 2).

As shown in FIG. 2, the aggressor radio interface 12 comprises the transmitter 18 already discussed above in connection with FIG. 1 as well as a calibration manager 20' that may be implemented by the processor 20 illustrated in FIG. 1 or any other processor integrated into the aggressor radio interface 12 for the communication device 10. The transmitter 18 is coupled to both the calibration manager 20' and a Radio Frequency (RF) front end 12' provided for the aggressor radio interface 12. The calibration manager 20' is coupled to both the memory 30 storing spectral emission information and, via an input interface IIF as well as an output interface OIF (indicated by arrows in FIG. 2), to the victim radio interface 14.

The victim radio interface 14 likewise comprises a calibration manger 32 in the form of a processor coupled via dedicated input and output interfaces IIF, OIF (again illustrated in the form of arrows) to the calibration manager 20' of the aggressor radio interface 12. The victim radio interface 14 comprises a measurement unit 34 connected to the calibration manager 32 and is coupled to a dedicated radio front end 14'.

Figure 3:
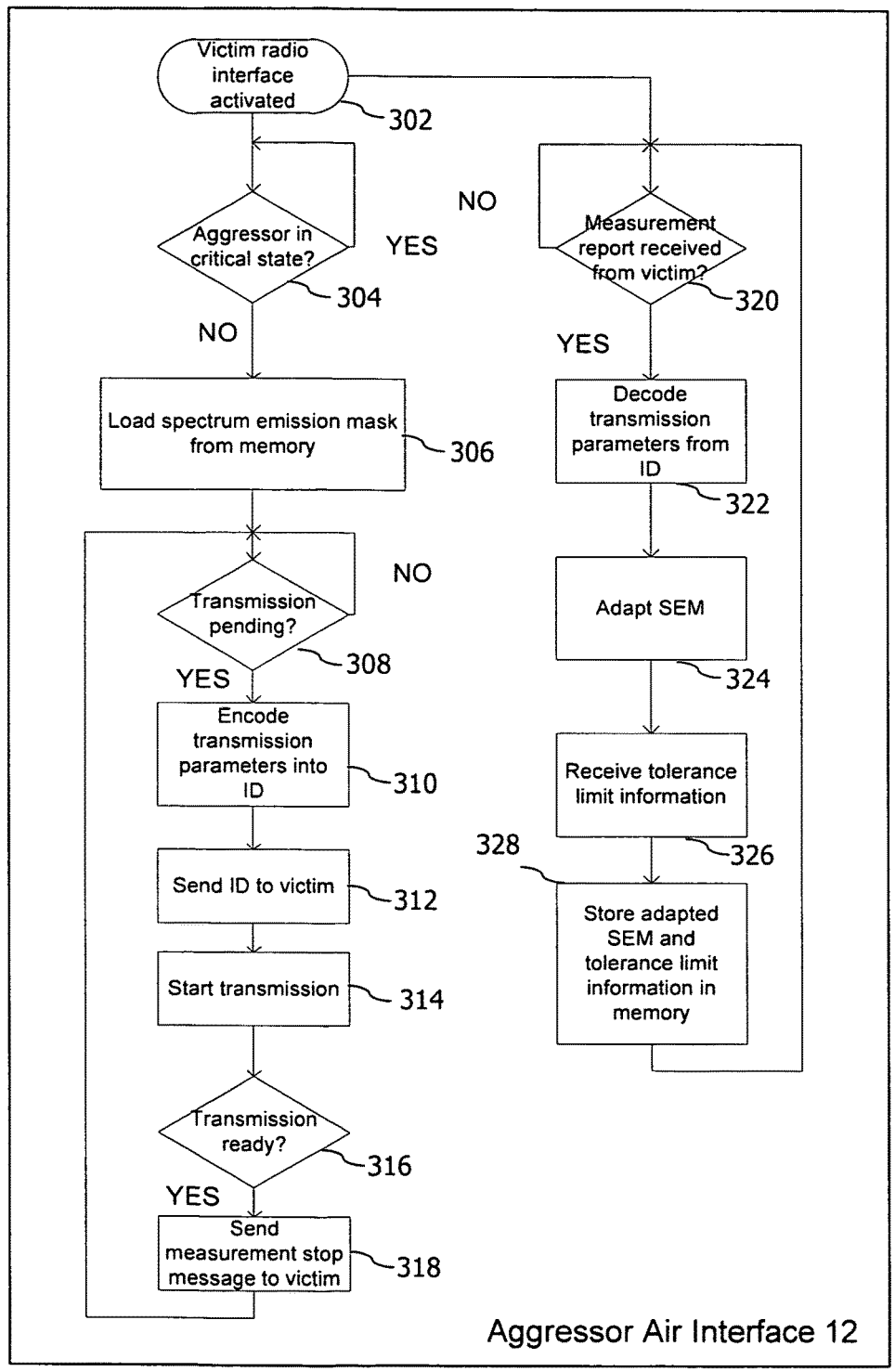
FIG. 3 is a flow diagram illustrating a method embodiment in connection with requesting a measurement and adapting spectral emission information.
Figure 4:
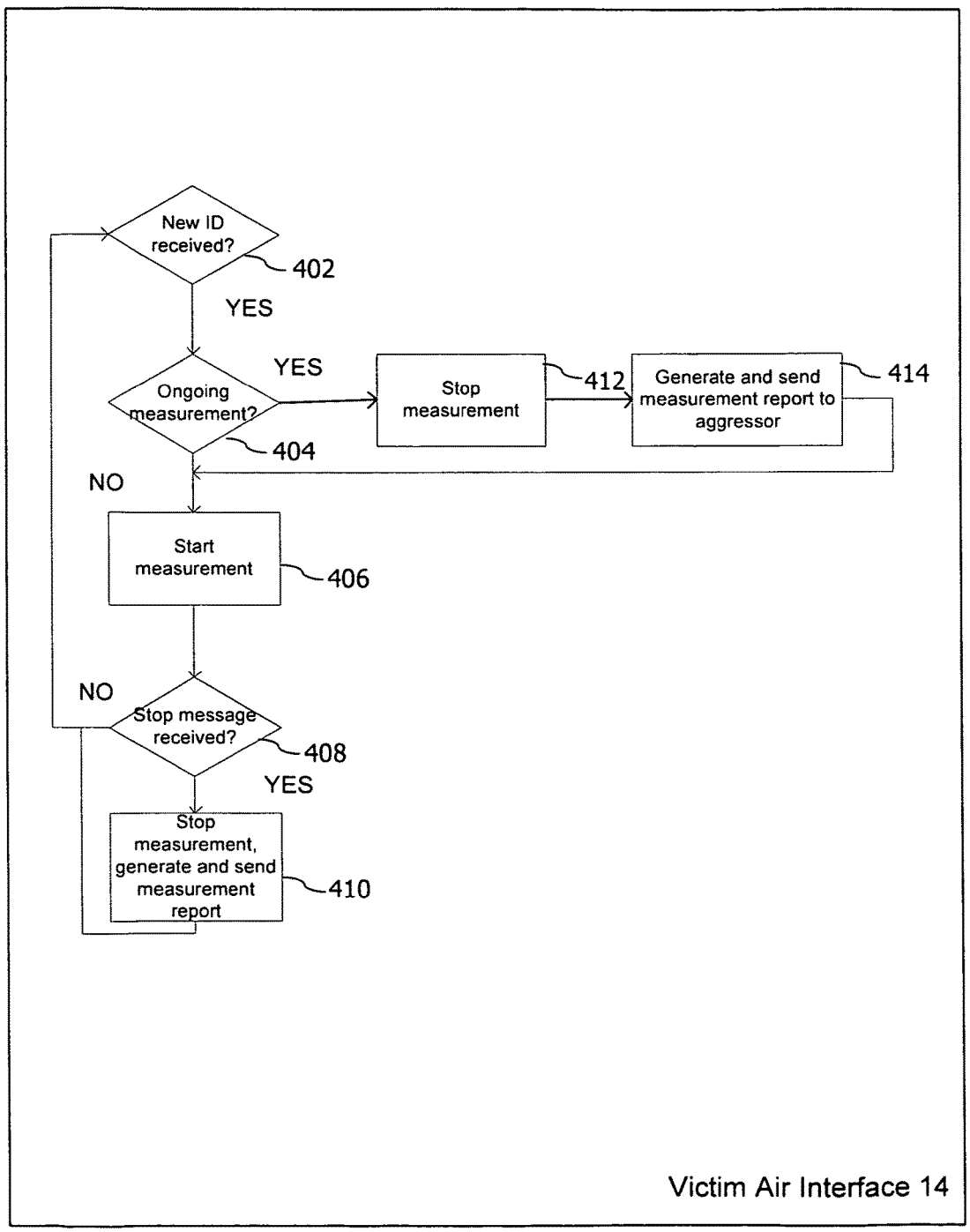
FIG. 4 is a flow diagram illustrating a method embodiment in connection with generating and reporting a measurement.

In the following the operation of the aggressor radio interface 12 and the victim radio interface 14 in connection with triggering measurement reports, generating measurement reports and adapting spectral emission information based on the measurement reports will be described in more detail with reference to the flow diagrams 300, 400 of FIGS. 3 and 4. The flow diagram 300 of FIG. 3 illustrates the corresponding steps performed for the aggressor radio interface 12. The steps may be performed under control of at least one of the processor 20 illustrated in FIG. 1 and the calibration manager 20' illustrated in FIG. 2.

With reference to the flow diagram 300 of FIG. 3, the operation starts with activation of the victim radio interface 14 in step 302. As an example, the victim radio interface 14 may transit from a sleep mode to an active mode, or may simply be switched on.

In a next step 304 it is determined whether the aggressor radio interface 12 is in a critical state. A critical state will be identified in case the aggressor radio interface 12 operates in a mode which could potentially cause co-existence issues with the victim radio interface 14. As an example, a multi-mode smartphone could operate in GMS mode and then be handed over to an LTE mode in band 7. The GMS mode is uncritical for the WLAN or Bluetooth radio interface 14, while operation of the aggressor radio interface 12 in LTE band 7 would be critical. In such a case LTE operation could go to a sleep mode while a user of the smartphone might continue streaming video or audio data over the WLAN or Bluetooth radio interface 14. This would then be an uncritical state again. The following steps are only performed in case the aggressor radio interface 12 is in an uncritical state.

In an optional step 306 an SEM is loaded from memory 30 by the calibration manager 20' (e.g., for purposes that will be explained in more detail below with reference to FIG. 5).

In a further step 308 it is determined whether there is a transmission pending for the aggressor radio interface 12. When there is a transmission pending, the calibration manager 20' receives one or more transmission parameters characteristic of the transmission from the transmitter 18 as illustrated by an arrow in FIG. 2. The transmission parameters comprise a power amplifier back-off. The power amplifier back-off is the difference (in dB) between the actual transmit power and the maximum transmit power (e.g., 23 dBm=200 mW for LTE). Further, the transmission parameters include one or more of the carrier frequency of the transmission or a suitable representation thereof (e.g., 3GPP EARFCN), a carrier system bandwidth (e.g., 1.4, 3, 5, 10, 15 or 20 MHz for LTE) and an effectively used bandwidth (e.g., as a concise representation of a resource block allocation for the present exemplary LTE scenario).

In step 310 the calibration manager 20' encodes the transmission parameters, optionally with the exception of or together with the power amplifier back-off, into a unique identifier. The encoding operation in step 310 targets at compressing the transmission parameters as far as possible. If, for example, if there exist 256 different power levels, 6 different bandwidths and 10 different transmission bandwidths, the identifier could be a simple 15 bit integer number.

The victim radio interface 14 may be capable of decoding the transmission parameters from the identifier. Alternatively, the transmission parameters may be sent together with the identifier to the victim radio interface 14. In certain scenarios there may be no need for the victim radio interface 14 to have knowledge of the transmission parameters (sometimes except for the power amplifier back-off), for example because the victim radio interface 14 is anyhow configured to measure a predefined spectral range. In such a case the victim radio interface 14 need not be capable of decoding (all) transmission parameters from the identifier, and may just "blindly" return the identifier with the measurement result.

In a further step 312 the identifier is sent with the back-off information by the calibration manager 20' of the aggressor radio interface 12 to the calibration manager 32 of the victim radio interface 14. The identifier constitutes an indication, or request, for the victim radio interface 14 to perform a measurement based on the encoded transmission parameters. Optionally, the identifier may also be accompanied by an indication of a transmission activity status of the aggressor radio interface 12. The transmission activity status may assume either an active or an inactive state depending on whether a transmission via the aggressor radio interface 12 has started or ended, or is about to start or end, respectively. In the present embodiment it will be assumed that an active transmission activity status will be signalled to the victim radio interface 14 in step 312.

In a next step 314 the transmitter 18 starts transmission via the RF front end 12' in accordance with the set of transmission parameters previously communicated to the calibration manager 20'. Once the transmission has ended or is about to end, the transmitter 18 informs the calibration manager 20' thereof (see step 316). The calibration manager 20' of the aggressor radio interface 12 then indicates an inactive transmission activity status to the calibration manager 32 of the victim radio interface 14. The corresponding indication is sent as a measurement stop message in step 318. The message may optionally also include the unique identifier of the transmission parameter combination determined in step 310. Once the measurement stop message has been sent in step 318, the method loops back before step 318 to wait for the next transmission activity via the aggressor radio interface 12.

Responsive to the measurement stop message sent in step 318, the aggressor radio interface 12 receives a measurement report from the victim radio interface 14. The measurement report includes one or more of an in-band noise level measured by the victim radio interface 14 and a frequency range or frequency used for the measurement. The measurement report further comprises the unique identifier associated with the transmission parameters underlying the transmission via the aggressor radio interface 12.

Once it has been determined in step 320 that the measurement report has been received, the transmission parameters are decoded from the identifier in step 322. Based on the decoded transmission parameters a suitable SEM in memory 30 is determined for adaption purposes or for newly generating an SEM from an existing SEM. In memory 30 a plurality of SEMs is stored for various transmission parameters or transmission parameter sets. An exemplary minimum setting could be one SEM per frequency band and system bandwidth, optionally, with a certain frequency range and resolution around a carrier frequency. In LTE this could, for example, be 6 masks for band 7 with a range from −190 to 0 MHz around the carrier frequency and a resolution of 10 MHz. Accordingly, in step 324 an SEM associated with one or more of the decoded transmission parameters is loaded from memory 30 and adapted based on the measured in-band noise level and the frequency range or frequency used for the measurement (as reported by the victim radio interface 14).

In a next step 326, tolerance limit information is received from the victim radio interface 14. The tolerance limit information is indicative of a tolerable noise level from the perspective of the victim radio interface 14 for transmissions via the aggressor radio interface 12. The tolerance limit information may take the form of a single parameter or the form of a more complex spectral emission mask ("noise mask") such as a spectral table or a spectral function. It should be noted that the tolerance limit information could also be known a priori to the aggressor radio interface 12, or could be received at a different point in time.

Finally, in step 328, the adapted SEM is stored, optionally together with associated tolerance limit information, in memory 30 and a calibration cycle has ended. From step 328 the method loops back to step 320. The calibration manager 20' may keep track of the adaption such that a fully adapted SEM can be identified (and further calibration cycles with respect to such an SEM can be avoided).

In the following the operation of the victim radio interface 14 in connection with performing and reporting measurements will be described with reference to the flow diagram 400 of FIG. 4.

The method starts in step 402 upon receipt, by the calibration manager 32 of the victim radio interface 14, of a message including a transmission parameter identifier that may optionally be accompanied by the power amplifier back-off and an indication of the transmission activity status of the aggressor radio interface 12. The calibration manager 32 then determines whether there is any reception activity via the victim radio interface 14. Should this not be case it is next determined in step 404 whether there is any on-going measurement. Should this also not be the case the calibration manager 32 decodes the transmission parameters from the received identifier and selects a frequency range or frequency for measurement depending on the decoded transmission parameters.

In a next step 406 a received power measurement in the decoded frequency range or at the decoded frequency range is started by the measurement unit 34. The measurement unit 34 may be a dedicated measurement unit or an existing measurement unit of the victim radio interface 14. Depending on the duration of a measurement, multiple measurements (in multiple frequency ranges) could be performed sequentially.

When the calibration manager 32 of the victim radio interface 14 receives a further message from the aggressor radio interface 12 it checks in step 408 if the message includes an indication of an inactive transmission activity status of the aggressor radio interface 12. In the case of an inactive transmission activity status, the method proceeds to step 410 and any on-going measurement is stopped in step 410 and a measurement report is generated by the calibration manager 32 and sent to the aggressor radio interface 12. Otherwise, the method loops back from step 408 to step 402.

In step 402 it is determined based on the content of the further message if only the power amplifier back-off has changed. In such a case an intermediate measurement result is normalized based on the power amplifier back-off and the measurement is continued in step 406. Otherwise, if the transmission parameters have changed (i.e., if a corresponding identifier transported in the further message has changed), any on-going measurement is stopped in step 412 and a measurement report is generated and sent to the aggressor radio interface 12 in step 414. The measurement report may be omitted if the measurement period was too short. A new measurement is started immediately thereafter based on the current set of transmission parameters in step 406.

The measurement unit 34 may include a fast Automatic Gain Control (AGC) to enable short measurements. It may compute the mean power of the received signal. The measurement duration may be flexible, but at least needs to ensure a minimum effective measurement length. There may be an indication from the measurement unit 34 to the calibration manager 32 in case the minimum length was reached or not such that the measurement may be discarded if it was prematurely stopped. To allow longer measurements, a normalization of intermediate results may be performed as explained above to compensate for power changes of the aggressor transmission. The measurement results are normalized to the aggressor maximum transmit power (e.g., the back-off may be added to the result). For certain frequency combinations higher order inter-modulations of simultaneous transmissions of both radio interfaces 12, 14 may fall into the receive band of one of them. In this case the measurement may be discarded.

Figure 5:
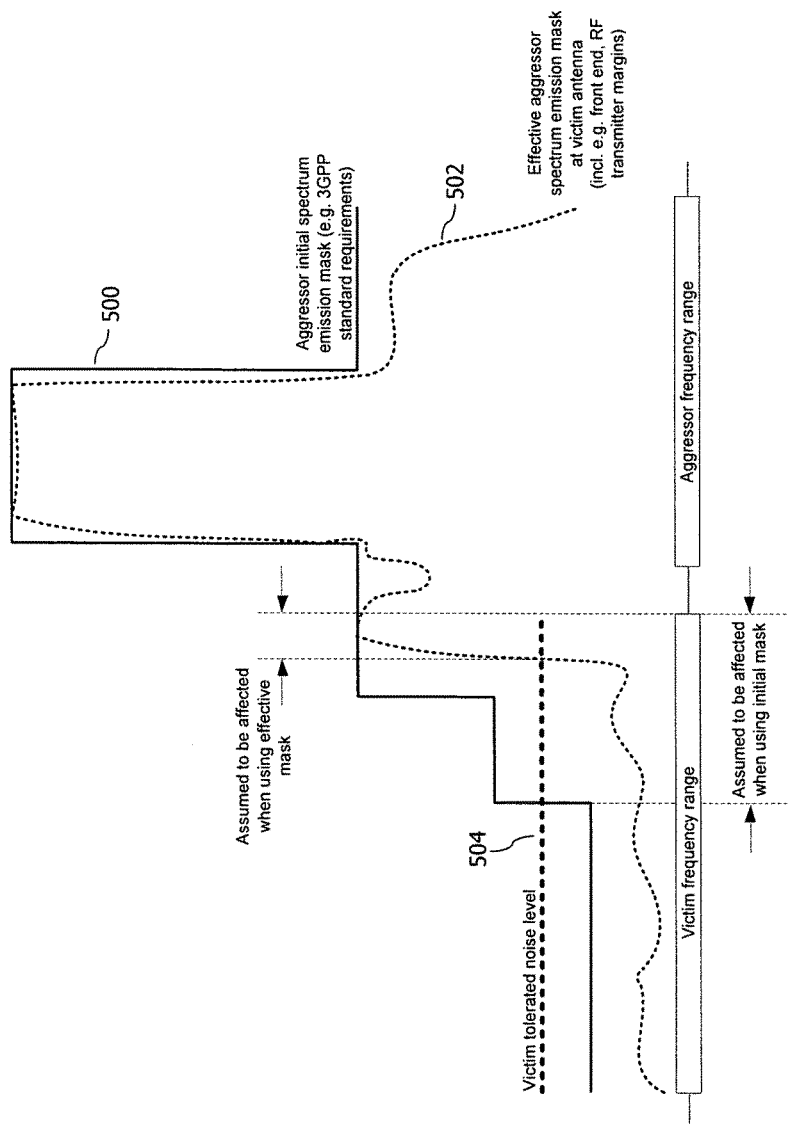
FIG. 5 schematically illustrates a spectral emission mask for a first radio interface as well as a tolerance limit associated with a second radio interface.

FIG. 5 exemplarily illustrates the result of a repeated adaptation process of spectral emission information. Specifically, FIG. 5 shows a comparison between an exemplary 3GPP (e.g., LTE) SEM 500 on the one hand and an adapted, or "effective", SEM 502 on the other hand that has been generated on the basis of multiple measurement reports from the victim radio interface 14. As will be appreciated, the adapted SEM 502 is in many spectral portions substantially below the predefined SEM 500.

Also illustrated in FIG. 5 is a tolerated noise level 504 (i.e., tolerance limit information as retrieved from the memory 30) that has been communicated from the victim radio interface 14 to the aggressor radio interface 12. By comparing, as described above with reference to FIG. 1, for an upcoming transmission the resulting spectral emission as defined by the "effective" SEM 502 (read from the memory 30 based on the associated transmission parameters) with the tolerated noise level 504 of the victim radio interface 14 (likewise read from the memory 30), the aggressor radio interface 12 can decide responsive to a transmission suppression request from the victim radio interface 14 whether the transmission will actually interfere with scheduled or on-going reception activities of the victim radio interface 14 and can decide to ignore, or discard, the transmission suppression request.

As becomes apparent from FIG. 5, the spectral range assumed to be affected when using the "effective" SEM 502 is much smaller than the spectral range assumed to be affected when using the predefined, or "initial", SEM 500. Consequently, the number of transmission suppression request signals that can be discarded or ignored without prejudicing reception activities of the victim radio interface 14 strongly increases, which also leads to a link quality increase with respect to the aggressor radio interface 12.

At has become apparent from the above discussion of exemplary embodiments, the technique presented herein may avoid extensive calibration procedures during production as the technique may be performed during regular operation. The technique is capable of inherently measuring all front-end components to reflect the effective interference accurately. In a particular beneficial implementation existing measurement capacities inside one or more of the radio interfaces may be used for performing the measurements.

Moreover, aggressor and victim radio interfaces 12, 14 need only loosely be coupled. When the aggressor radio interface 12 indicates a transmission activity, the victim radio interface 14 autonomously decides to start a measurement or not. The victim radio interface 14 may in particular decide not to be woken up from sleep mode to save power. Once a measurement has been performed, the measurement report may be sent any time later. Due to the identifier associated with the measurement report, the corresponding transmit parameters can still be identified at any point in time for updating or generating the associated SEM.

Due to the progressive adaptations and tracking of the adaptions, the self-calibration will occur less and less frequently during regular operation of the communication device 10. Moreover, due to the provision of an initial SEM, a performance of the communication device 10 will be acceptable from the very beginning and improve over time. If, for example, the technical properties of the communication device 10 allow to realize an improvement of 10 dB at certain frequencies compared to the spectral emission limits (e.g., SEM) defined in a communication standard, the corresponding margin may be utilized as soon as the corresponding frequencies have been used and measured.

Moreover, the 3GPP spectral emission limits always refer to a system bandwidth that is used by a base station and does not change. Within this system bandwidth there exist resource blocks of 180 kHz that are dynamically allocated. As such, the mobile communication device 10 may, for example, only utilize 180 or 360 kHz, although the system bandwidth is much larger. In such a case, the actual spectral emissions will be much more favourable than the 3GPP spectral emission limits. The resulting margins may be utilized by the technique presented herein. Specifically, multiple SEMs may be provided and adapted for exploiting such margins.

In sum, the present disclosure permits an improved co-existence and interworking between various kinds of radio interfaces integrated into a single communication device. To this end a selective suppression of transmission activities of one radio interface is performed in case of upcoming reception activities of another radio interface. The technique presented herein is easy to implement and may provide a hierarchical method to limit co-existence interference with more and more intrusive actions, including prioritizing a critical subset of uplink transmissions (i.e., depending on the interference level).

While the technique presented herein has been described with respect to particular embodiments, those skilled in the art will recognize that the present invention is not limited to the specific embodiments described herein. It is to be understood that this disclosure is only illustrative. Accordingly, it is intended that the invention be limited only by the scope of the claims appended hereto.

The invention claimed is:

1. A method of processing a spectral emission mask in a mobile communication device including a transmitter, a microprocessor, a first radio interface, and a second radio interface, the method comprising the following steps performed for the first radio interface:
   the microprocessor performing a transmission via the transmitter of the first radio interface;
   the microprocessor receiving, from the second radio interface, a measurement report for the transmission;
   the microprocessor adapting an initial spectral emission mask based on the measurement report, wherein the spectral emission mask is indicative of an emission level associated with the first radio interface and as measurable at the second radio interface;
   the microprocessor receiving a signal indicative of an upcoming or on-going reception via the second radio interface;
   the microprocessor analyzing an on-going or scheduled transmission via the first radio interface with respect to the spectral emission mask; and
   the microprocessor interrupting or delaying the transmission depending on a result of the analysis,
   wherein the transmission is interrupted or delayed in case spectral properties of the transmission as defined by the spectral emission mask would exceed a tolerance limit associated with the second radio interface.

2. The method of claim 1, further comprising:
   the microprocessor determining at least one transmission parameter for the transmission via the first radio interface, wherein the transmission is performed in accordance with the at least one transmission parameter; and
   the microprocessor sending an indication to perform a measurement based on the at least one transmission parameter towards the second radio interface.

3. The method of claim 2, wherein the at least one transmission parameter comprises one or more of a power amplifier back-off, a carrier frequency or carrier frequency band, a system bandwidth, and an actually used transmission bandwidth.

4. The method of claim 2, further comprising the microprocessor repeating the steps based on different transmission parameters.

5. The method of claim 2, wherein the measurement report is received in connection with an indication of at least one of the at least one transmission parameter and a reference identifier associated with the at least one transmission parameter.

6. The method of claim 2, wherein the at least one transmission parameter is sent towards the second radio interface in connection with a reference identifier associated with the transmission or the at least one transmission parameter.

7. The method of claim 6, wherein the indication is accompanied by the reference identifier associated with the transmission or the at least one transmission parameter underlying the transmission activity status.

8. The method of claim 1, further comprising the microprocessor sending an indication of a transmission activity status of the first radio interface towards the second radio interface.

9. The method of claim 1, further comprising the microprocessor receiving, from the second radio interface, information regarding the tolerance limit associated with the second radio interface.

10. The method of claim 1, wherein the spectral emission mask is at least one of provided and adapted on the basis of at least one of multiple frequency bands and multiple system bandwidths.

11. A method of providing a measurement report for processing a spectral emission mask in a mobile communication device including a transmitter, a microprocessor, a first radio interface, and a second radio interface, wherein the spectral emission mask is indicative of an emission level associated with the first radio interface and as measurable at the second radio interface, the method comprising the following steps performed for the second radio interface:
    the microprocessor receiving an indication to perform a measurement based on at least one transmission parameter for a transmission via the first radio interface;
    the microprocessor performing a measurement of the transmission via the first radio interface, wherein the measurement is performed in accordance with the at least one transmission parameter;
    the microprocessor generating a measurement report for the measurement;
    the microprocessor sending the measurement report towards the first radio interface;
    the microprocessor receiving a signal indicative of an upcoming or on-going reception via the second radio interface;
    the microprocessor analyzing an on-going or scheduled transmission via the first radio interface with respect to the spectral emission mask; and
    the microprocessor interrupting or delaying the transmission depending on a result of the analysis,
    wherein the transmission is interrupted or delayed in case spectral properties of the transmission as defined by the spectral emission mask would exceed a tolerance limit associated with the second radio interface.

12. The method of claim 11, further comprising the microprocessor sending a signal indicative of an upcoming or on-going reception via the second radio interface towards the first radio interface.

13. The method of claim 11, further comprising the microprocessor not taking a measurement action in case the second radio interface is in a sleep mode.

14. The method of claim 11, further comprising the microprocessor receiving an indication of a transmission activity status of the first radio interface; and at least one of starting, resuming and stopping the measurement based on the transmission activity status of the first radio interface.

15. The method of claim 11, wherein the measurement report comprises one or more of a measured noise level, an indication of a spectral range or frequency that has been measured, and a reference identifier associated with the transmission or the at least one transmission parameter.

16. The method of claim 11, wherein the method is performed in the field during regular operation of the communication device.

17. The method of claim 11, wherein the first radio interface and the second radio interface are configured to utilize closely spaced carrier frequencies.

18. The method of claim 11, wherein the first radio interface conforms to one of the LTE-W-CDMA, GSM, TD-SCDMA and CDMA specifications and the second radio interface conforms to one of the WLAN, Bluetooth and GNSS specifications.

19. A non-transitory computer readable medium having instructions stored therein, which when executed by a processor causes the processor to perform the steps of claim 11.

20. A mobile communication device for processing a spectral emission mask, the mobile communication device comprising:
a first radio interface;
a second radio interface, wherein the spectral emission mask is indicative of an emission level associated with the first radio interface and as measurable at the second radio interface;
a transmitter configured to perform the transmission via the first radio interface;
an input interface (IIF) configured to receive, from the second radio interface, a measurement report for the transmission;
a microprocessor configured to adapt an initial spectral emission mask based on the measurement report
the microprocessor configured to receive a signal indicative of an upcoming or on-going reception via the second radio interface;
the microprocessor configured to analyze an on-going or scheduled transmission via the first radio interface with respect to the spectral emission mask; and
the microprocessor configured to interrupt or delay the transmission depending on a result of the analysis,
wherein the transmission is interrupted or delayed in case spectral properties of the transmission as defined by the spectral emission mask would exceed a tolerance limit associated with the second radio interface.

21. The mobile communication device of claim 20, wherein the processor is further configured to determine at least one transmission parameter for the transmission via the first radio interface, wherein the transmission is performed in accordance with the at least one transmission parameter; and an output interface (OIF) configured to send an indication to perform a measurement based on the at least one transmission parameter towards the second radio interface.

22. A mobile communication device for providing a measurement report for processing a spectral emission mask in a communication device having a first radio interface and a second radio interface, wherein the spectral emission mask is indicative of an emission level associated with the first radio interface and as measurable at the second radio interface, the mobile communication device comprising:
an input interface (IIF) configured to receive an indication to perform a measurement based on at least one transmission parameter for a transmission via the first radio interface;
a microprocessor configured to perform a measurement of the transmission via the first radio interface, wherein the measurement is performed in accordance with the at least one transmission parameter;
a generator configured to generate a measurement report for the measurement;
an output interface (OIF) configured to send the measurement report towards the first radio interface;
the microprocessor configured to receive a signal indicative of an upcoming or on-going reception via the second radio interface;
the microprocessor configured to analyze an on-going or scheduled transmission via the first radio interface with respect to the spectral emission mask; and
the microprocessor configured to interrupt or delay the transmission depending on a result of the analysis,
wherein the transmission is interrupted or delayed in case spectral properties of the transmission as defined by the spectral emission mask would exceed a tolerance limit associated with the second radio interface.

* * * * *